Figures 1, 2:
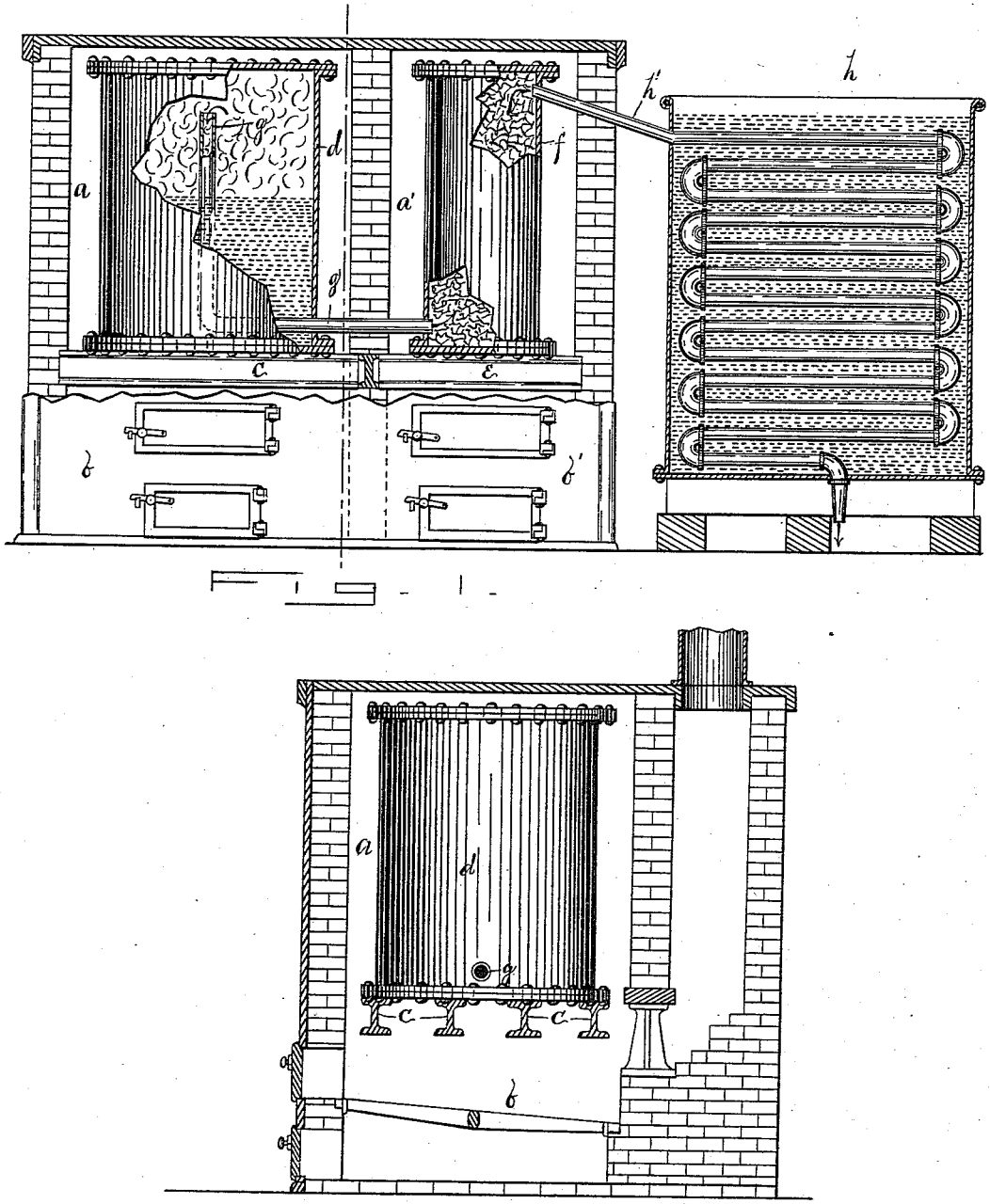

(No Model.)

W. H. PITT.
PROCESS OF DISTILLING PETROLEUM.

No. 379,492.  Patented Mar. 13, 1888.

Witnesses:
Otto Hoddick
F. W. Fisher

Inventor,
William H. Pitt.
By, W. F. Miller
Attorney.

UNITED STATES PATENT OFFICE.

WILLIAM H. PITT, OF BUFFALO, NEW YORK, ASSIGNOR OF ONE-HALF TO GEORGE H. VAN VLECK, OF SAME PLACE.

PROCESS OF DISTILLING PETROLEUM.

SPECIFICATION forming part of Letters Patent No. 379,492, dated March 13, 1888.

Application filed October 15, 1887. Serial No. 252,462. (No specimens.)

*To all whom it may concern:*

Be it known that I, WILLIAM H. PITT, a citizen of the United States, residing at Buffalo, in the county of Erie and State of New York, have invented certain new and useful Improvements in Processes of Distilling Petroleum; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In some of the petroleum-oils there is a strong odor somewhat like the smell of garlic, which escapes gradually from such oils if exposed to the air at the wells in open barrels, tanks, and other receptacles which may be used to hold them. When such garlicky petroleum is distilled according to the common processes now in use at the oil-refineries, the distillates are affected with the disgusting odor existing in the crude oil to such an extent as to render them unsuitable for the uses to which such products are commonly applied.

The series of liquid distillates or hydrocarbons, under the familiar names of "naphtha," "benzine," "kerosene," and "lubricating-oil," having the garlicky sulphurous odor are greatly damaged for the market, in consequence of which the distilling of the crude petroleum containing the disgusting smell is greatly retarded at the present time or almost abandoned.

The object of my invention is to so distill petroleum having the offensive odors in such a manner that the distillates may be marketable and made use of as solvents, illuminants, lubricants, or for any other purposes to which the products of petroleum not having the offensive odors may be appropriated.

My invention consists, broadly, in passing the hot vapors arising from odoriferous petroleum above described through, around, and among a heated metallic substance or metallic compound suitably divided or comminuted into parts, which shall effectually deodorize the vapors and cause the condensed and other products from offensive crude oils to be purified, rendering them capable of use in the arts, sciences, and manufactures.

In the drawings, Figure 1 is a front elevation of my improved apparatus with portions broken away to show interior construction, and Fig. 2 is a vertical section taken in the line *x x* of Fig. 1.

Referring to the drawings, a furnace is seen having the two separate heating-compartments *a* and *a'*, provided, respectively, with the separate fire-boxes *b* and *b'*, in order that an independent fire can be maintained in each.

In the compartment *a*, and resting upon girders *c*, seated at their ends in the brick walls of the furnace, is the receptacle or retort *d*, in which is placed the offensive crude petroleum to be operated upon. As will be seen clearly in Fig. 2, the retort *d* is so placed as to permit the heat to circulate freely around, above, and below the retort. In the chamber *a'* is similarly placed upon the girders *e* the receptacle *f*, in which the filtration or deodorization is to be effected.

*g* is a pipe open at both ends, and preferably bent at an angle, as shown, its upright portion resting vertically within the retort *d*, its upper open end reaching above the level of the liquid oil in the retort. Its lower or horizontal portion passes out through the side wall of the retort *d* at or near its bottom, through the division-wall of the two chambers *a* and *a'*, and into the receptacle or filter *f*, preferably at or near its bottom, as shown.

*h* is a condenser of any well-known form, connected by the pipe *h'* with the filter *f* at or near its top, as shown.

The crude petroleum having the offensive odor referred to is placed in the retort *d* and is there vaporized by the heat of the chamber *a*, such vapor passing down through the pipe *g*, its heat being retained and condensation prevented by the hot liquid oil surrounding such pipe. In this state it passes into the bottom of the filter *f*, in which receptacle the principal step of my improved process is carried out—viz., the separation of the sulphurous garlicky odors from the body of the vapor. To effect this purpose I place within the receptacle *f* a substance, *f'*, suitably divided or comminuted, so as to present to the vapor passing therethrough the greatest contacting-surface possible.

The substance employed as the deodorizer must necessarily be of such a nature as to have a strong affinity for the sulphurous portion of the vapors in passing in contact with the substance, which may be of different metals—such as iron or copper or metallic compounds—but preferably iron, owing to its cheapness and durability. As the vapors pass through and around the broken or finely-divided particles of the substance, the element or elements of the sulphur fumes are attracted and retained, while the balance of the vapors, consisting principally of hydrogen and carbon, (which go to form chemically-pure petroleum,) pass out of the filter and are condensed.

The deodorizing metallic substance, of whatever nature, employed is kept always at about the same or a higher temperature than the vapors entering the filter by the independent heat of the chamber $f$.

The sulphurous odors of certain varieties of petroleum which in distilling it is the object of my invention to improve are supposed to arise mostly from the presence of sulphur in chemical union with an element or elements in the composition of the oil. This sulphurous compound of whatever nature existing in the oil, and which chiefly causes the disgusting odor, is broken up when in a state of hot gas or vapor, as it is diffused and filtered through the hot material which is used as the chemical deodorizer. The deodorization is effected principally by the sulphur uniting with the metallic substance of the filter at the same or a comparatively higher temperature than the vapor itself as it leaves the retort, on account of sulphur having a greater affinity at this temperature for the substance or substances in the deodorizer than for the element or elements entering into the chemical constitution of the oil, which is understood to be principally hydrogen and carbon.

In employing a proper deodorizing material for the filter I do not wish to be confined to metals, as metallic compounds in general would suffice—for example, the oxides of iron—the gist of my invention being broadly in the employment of any metallic substance or compound whatever which possesses the requisite affinity for the objectionable sulphurous vapors which I seek in this way to separate from the body of the hot vapor in the operation of cleansing or deodorizing the same.

The pipe $g$ need not necessarily enter the bottom of the filter for effective results, although this is my preferred arrangement.

The apparatus herein shown for carrying out my improved process is reserved as subject-matter for a separate application to be subsequently filed by me.

I claim—

The process of distilling petroleum having sulphurous or other offensive odors, consisting, essentially, of vaporizing such liquid petroleum, then passing the vapors so formed through a receptacle heated at the same or a higher temperature than the vapors coming from the still, said receptacle being filled with a metal or metals—such as iron or metallic compounds—having an affinity for the sulphurous vapors and other objectionable compounds, whereby they are held and retained by such substance, and conducting away and condensing the balance of the vapors, substantially as shown and described.

In testimony whereof I have signed my name to this specification in the presence of two subscribing witnesses.

WILLIAM H. PITT.

Witnesses:
OTTO HODDICK,
W. T. MILLER.